United States Patent

[11] 3,572,528

[72] Inventors Michael D. Morton
 Hinsdale;
 Richard R. Conners, Chicago, Ill.
[21] Appl. No. 824,548
[22] Filed May 14, 1969
[45] Patented Mar. 30, 1971
[73] Assignee International Harvester Company
 Chicago, Ill.

[54] UNIFORM STRESS CANTILEVER BEAM
 8 Claims, 5 Drawing Figs.
[52] U.S. Cl. .................................................... 214/145,
 293/62, 52/731
[51] Int. Cl. ..................................................... B66f 9/00,
 B66f 11/00
[50] Field of Search ........................................ 214/145;
 52/731; 29/155; 293/60, 61, 62; 296/102

[56] References Cited
UNITED STATES PATENTS
| 1,917,666 | 7/1933 | Russell | 214/145 |
| 2,754,064 | 7/1956 | Voltz et al. | 52/731X |
| 2,789,480 | 4/1957 | Wellaver | 52/731X |

Primary Examiner—Gerald M. Forlenza
Assistant Examiner—Lawrence J. Oresky
Attorney—Noel G. Artman ABSTRACT: A cantilever beam for use as a safety frame or a loader boom arm for a tractor having angle or channel members forming an enclosed hollow section beam. The members are secured together by welds which are spaced at progressively wider intervals from the supported end of the beam so that the stress created by a load imposed at the free end of the beam is substantially uniformly distributed along the length thereof.

Patented March 30, 1971 3,572,528

Inventors:
Michael D. Morton
Richard R. Conners

Attorney

UNIFORM STRESS CANTILEVER BEAM

BACKGROUND AND SUMMARY OF THE INVENTION

Safety frames of the two-post-type have been used, particularly on farm tractors, to provide protection for the operator in the event of a tractor upset. The vertical posts of such safety frames are secured at one end to the tractor, generally by attachment to the rear axle carrier, and, even though interconnected by a crossbar at the top, function as cantilever beams. When a cantilever beam is of uniform cross section and loaded at its free end, the maximum stress will occur at its base or fixed end. Under these conditions, plastic deformation or yielding will be restricted to a very small area of the beam near its fixed end and the safety frame will be deflected toward the operator. Distributing the stress more uniformly along the vertical post of cantilever beam would preclude the cantilever beam from hinging at its base and pivoting around the section which will reach its plastic state first, thereby permitting the beam to absorb greater amounts of energy without giving rise to a failure of the type which would be injurious to the operator positioned within the frame. It has been known to construct cantilever beams so that they will have uniform stress, the general approach being to vary the section so that the I/c ratio varies as the moment imposed on the beam, which would result in unit stress remaining constant. Examples of this type of uniform strength beam are given on pages 443 through 444 in Mechanical Engineers Handbook, Fifth Edition, by Lionel S. Marks. However, constructing the cantilever beam or vertical post so that it had a shape such that the ratio of moment of inertia to the distance from the neutral axis to the outermost fiber varied exactly in accordance with the moment imposed on the beam would result in an impractical structure. That is, the width of the base of the beam becomes so wide that it obstructs the side vision of the operator beyond a tolerable limit, complicates the attachment problem and reduces the space for the operator's station, encumbering the ingress to and egress from such station.

It is therefore an object of the present invention to provide a cantilever beam which has a constant or substantially constant section and which is substantially uniformly stressed when loaded at its free end.

It is also an object of this invention to provide a two-post-type safety frame in which the vertical posts are substantially uniformly stressed so that the plastic deformation is distributed over a large portion of the beam's length.

It is a further object of this invention to provide a boom arm for a loader which is substantially uniformly stressed.

It is also an object of this invention to provide a method for constructing a cantilever beam, of constant cross section so that it is substantially uniformly stressed.

These and other objects of the present invention will become more readily apparent upon a perusal of the drawings wherein.

PREFERRED EMBODIMENT OF THE INVENTION

Figure 1:
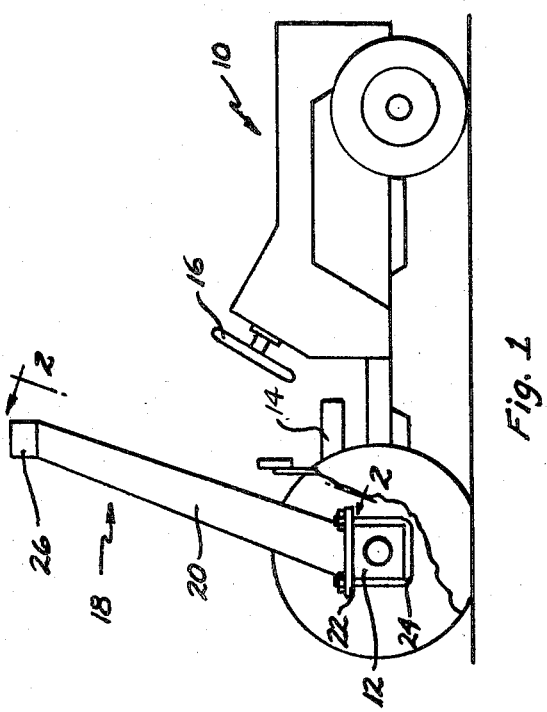
FIG. 1 is a side elevational view of a tractor having a safety frame of the two-post-type wherein the vertical posts are constructed in accordance with the present invention.

There is shown in FIG. 1 a tractor indicated generally as 10 having a rear axle carrier 12, an operator's seat 14 and a steering wheel 16. That portion of the tractor immediately adjacent to the seat 14 and steering wheel 16 is generally termed the operator's station and a zone of protection is provided for an operator within the station by means of the safety frame indicated generally at 18. The safety frame comprises a pair of vertical posts 20 which have a plate 22 secured at their base. U-bolt means 24 encircle the axle carrier 12 and engage the plate 22 to rigidly affix the vertical post 20 to the axle carrier 12. A crossbar 26 is connected between the free ends of the vertical post 20. While the vertical posts 20 are interconnected to their free ends, each post will function as a cantilever beam when the force is applied at its upper end.

Figure 2:
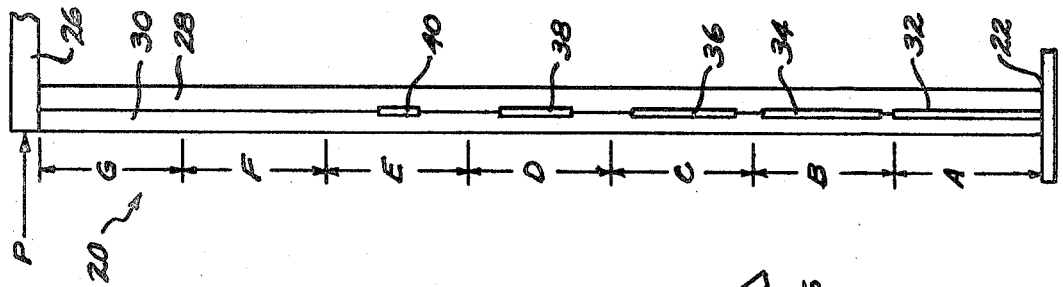
FIG. 2 is a view of the portion of the structure of FIG. 1 taken along section line 2-2.
Figure 3:
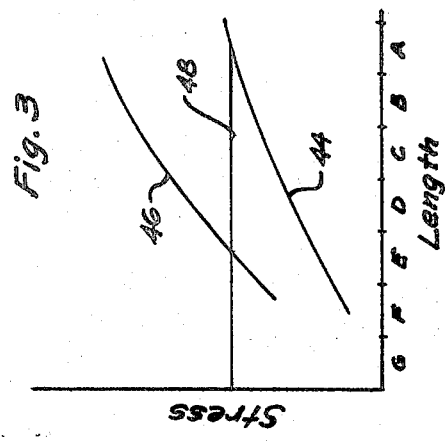
FIG. 3 is a graph showing the relationship between the stress levels in both a 100 percent welded beam and an unwelded beam.
Figure 4:
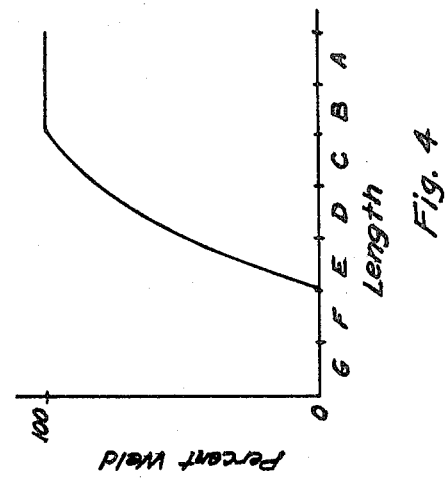
FIG. 4 is a graph showing the relationship between the percent of weld and the length of beam as derived from the graph of FIG. 3.

As shown in FIG. 2 each of the vertical posts 20 are formed by a pair of U-shaped channel members oriented so that the free ends of the U-shaped channels abut one another to form a hollow section enclosed beam. The U-shaped channels are secured together by welds 32, 34, 36, 38, 40 and 42, which welds are progressively of shorter length and spaced farther apart along the length of the vertical post 20 from its base plate 22. The spacing of the welds and the length of the weld is determined by assuming the application of a load P and by dividing the beam into equal increments as indicated by A through G inclusive. As shown in FIG. 3, using the generally accepted equation for bending stress, namely $S=Mc/I$, the stresses are calculated assuming the $I/c$ ratios that would result if the beam were 100 percent welded. That is, if the beam were welded completely throughout its length along the lines which join the two channel sections the moment of inertia would be determined by the hollow box section. These stresses are plotted as shown at 44 in FIG. 3. Stresses for the same load P are then calculated on the basis of the two channel sections being completely unattached, that is without any weld at all. The stress as a function of length under those conditions is shown at 46 on the graph on FIG. 3. As will be apparent from viewing the graph on FIG. 3, the stress at any given point is always higher in the unwelded beam than in the welded beam. Since the graph of FIG. 3 is a stress vs. length relationship, a line can be constructed as at 48 which is the maximum desired stress level and is set just below that stress resulting at the base of the beam. As can be seen in FIG. 3 in the increment A the stress resulting from a completely welded beam is substantially equal to or just slightly below the desired stress level. Hence, throughout the increment A the beam will be 100 percent welded. In the increment B, the stress level resulting from the 100 percent welded beam will be substantially below the desired stress level and hence the beam is unwelded by an amount which is equal to the ratio between the distance from the desired stress level line 48 to the unwelded beam curve 46 and the distance between the desired stress level line 48 and the welded beam line 44. Performing the same analysis to obtain the ratio of the average distances from the lines 48 and 46 over the average distance between the lines 48 and 44 will provide the percent of unwelded length for each increment. FIG. 4 is a plot of the percent of welded area by increment developed from FIG. 3.

The resulting structure is one in which the welds are of longer length and spaced by greater distances progressively from the base of the vertical post. The interruptions in the weld create areas of stress concentration which tend to distribute the stress more uniformly along the post and hence allow more than one area to enter the plastic state of deformation. With greater number of areas entering the plastic state of deformation, the post 20 will not hinge about its base, where normally the maximum stress is developed.

Figure 5:
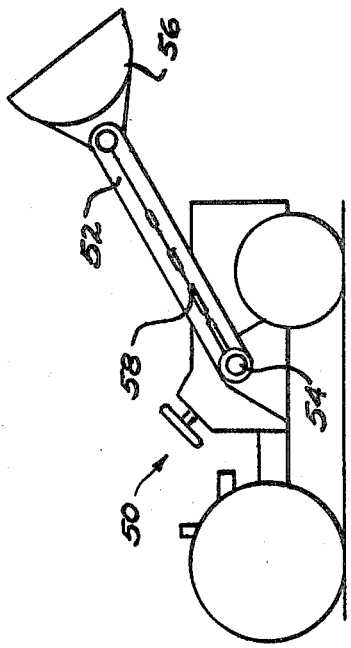
FIG. 5 is a side elevational view of a tractor loader in which the implement is supported by a boom arm constructed in accordance with the present invention.

As shown in FIG. 5 the cantilever beam according to the present invention may be utilized to support a bucket on a tractor loader. The tractor loader, indicated generally at 50 is provided with a pair of boom arms 52 which are pivotally supported at 54 to the tractor and extend forwardly to support a bucket 56. The boom arms are fashioned from a pair of channel members secured together by intermittent welds 58, which intermittent welds have a variable length and spacing so that the stress induced in the boom arms 52 is substantially uniform. While the preferred embodiment illustrates a pair of channel members secured together by welds extending down the side of a box formed thereby, it is anticipated that the same would result if the beam were formed from four angles welded together to form a box section, which welds are also spaced in accordance with the teaching of the invention.

We claim:

1. A cantilever beam comprising:
   a pair of channel members having one end fixed and the other end free;
   weld means securing said channel members together to define a hollow box section; said weld means being spaced progressively farther apart and of progressively shorter length from said fixed end; and
   whereby the beam is substantially uniformly stressed along its length when a load is applied at said free end.

2. A cantilever beam comprising:
   a plurality of elongated members having one end fixed and the other end free;
   weld means securing said members together to define an enclosed hollow section; said weld means being of irregular length and spaced at irregular intervals along said members; said weld means being longest at said fixed end and being progressively shorter and spaced further apart toward said free end; and
   whereby the beam is substantially uniformly stressed throughout its length when a load is applied to said free end.

3. A safety frame for a tractor comprising:
   a pair of upward extending posts secured at one end to the tractor and the other end being free; each said posts consisting of a plurality of elongated members; and
   weld means securing said members together to define an enclosed hollow section; and said weld means being spaced progressively farther apart and of progressively shorter length of said posts from said one end; whereby the posts are substantially uniformly stressed along their length when loaded at their free ends.

4. A safety frame according to claim 3 wherein said members consist of a pair of U-shaped channel members.

5. A safety frame according to claim 4 wherein said channel members have a straight taper.

6. A safety frame according to claim 3 wherein said members consist of four L-shaped angles.

7. A boom arm for a tractor loader, comprising:
   a plurality of members rotatably mounted at one end to said tractor loader, weld means securing said members together to define an enclosed hollow section; said weld means being of irregular length and spaced at irregular intervals along said members; and
   said weld means being longest at said one end and being progressively shorter and spaced farther apart away from said one end; whereby said boom arm is substantially uniformly stressed throughout its length.

8. A boom arm according to claim 7 wherein said members consist of a pair of U-shaped channel members.